March 1, 1966  E. E. McMANNIS  3,237,672
PNEUMATIC TIRE AND METHOD OF MAKING SAME
Filed April 22, 1963  2 Sheets-Sheet 1

INVENTOR.
EUGENE E. McMANNIS
BY
J. B. Holden
ATTORNEY

March 1, 1966  E. E. McMANNIS  3,237,672
PNEUMATIC TIRE AND METHOD OF MAKING SAME
Filed April 22, 1963  2 Sheets-Sheet 2

INVENTOR.
EUGENE E. McMANNIS
BY
J.B. Holden
ATTORNEY 3,237,672
PNEUMATIC TIRE AND METHOD
OF MAKING SAME
Eugene E. McMannis, Cuyahoga Falls, Ohio, assignor to The Goodyear Tire & Rubber Company, Akron, Ohio, a corporation of Ohio
Filed Apr. 22, 1963, Ser. No. 274,573
9 Claims. (Cl. 152—352)

This invention relates to an improved pneumatic tire and, more particularly, to a pneumatic tire having an unusually low profile and flat, wide tread.

Conventional tires made with cross-biased cord fabric in the carcass have a number of desirable characteristics but are well known to have relatively poor tread wear, rolling resistance, and traction as compared, for example, to belted tires which include a circumferentially inextensible band between the carcass and the tread. Such belted tires substantially increase tread wear over conventional tires as well as decreased rolling resistance and increased traction. However, belted tires, on the other hand, have a number of undesirable characteristics, including poor sidewall durability, envelopment of road obstacles, harsher riding, higher static steering torque, and substantially increased cost of production.

An object of this invention is to provide a pneumatic tire having a lower ratio of sectional height to sectional width than conventional or belted tires characterized by substantially better tread wear than conventional tires and substantially greater sidewall durability than belted tires.

Another object of this invention is to provide a low profile tire that has greater tread wear, lower rolling resistance, and a greater bead diameter than conventional tires of equal outside diameter and equivalent load-carrying capacity.

A further object of the invention is to provide a pneumatic tire casing which deflects less than a conventional tire of equivalent load carrying capacity.

Other objects and advantages of this invention will become apparent from the following description when read with reference to the accompanying drawings wherein.

Figure 1:
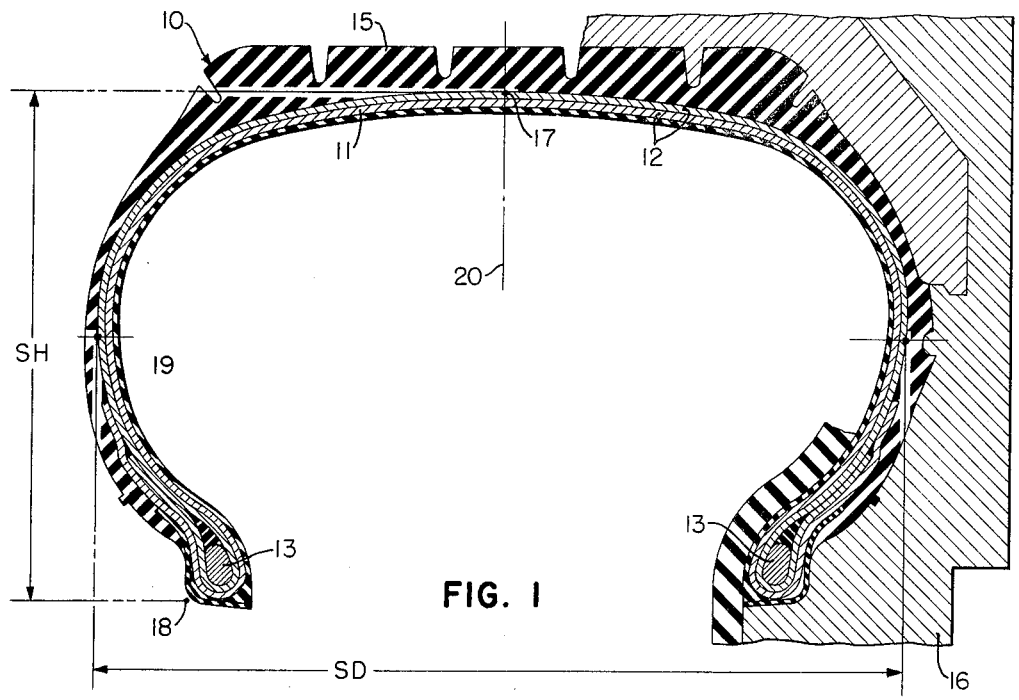
FIG. 1 is a cross-sectional view with parts broken away of the pneumatic tire of this invention shown in the mold.
Figure 3:
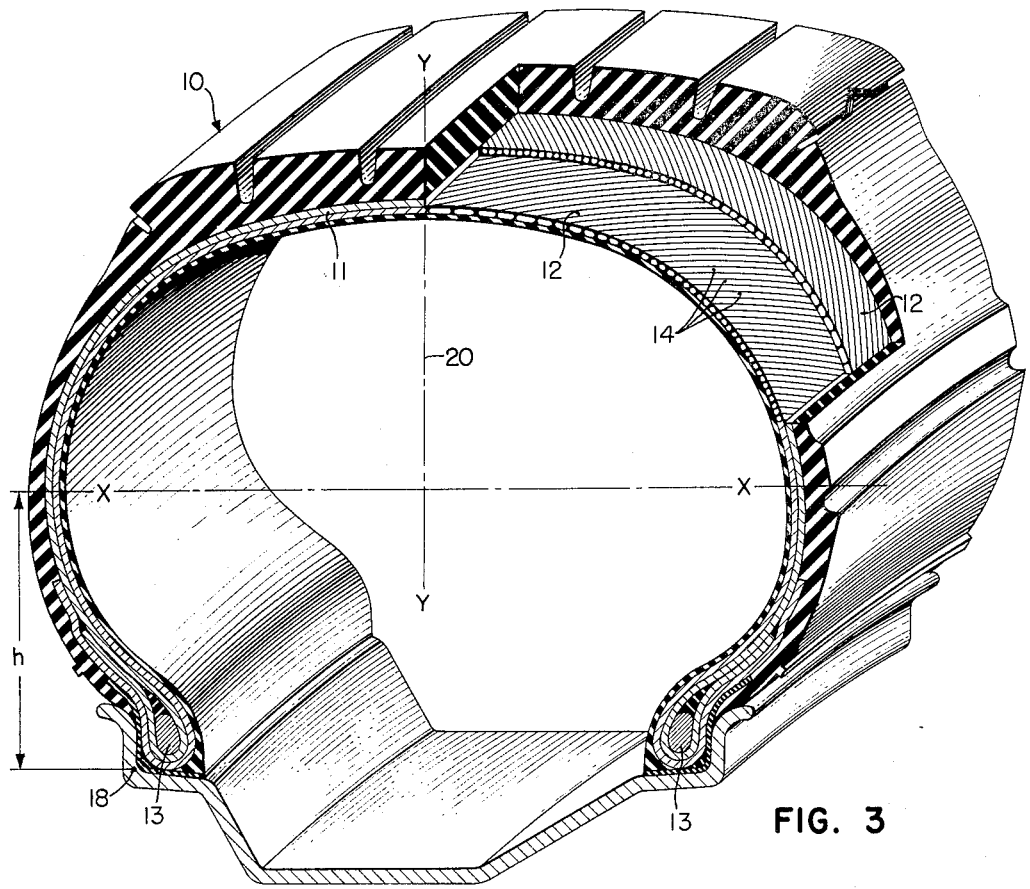
FIG. 3 is a cross-sectional view with parts broken away of the tire of this invention mounted upon a rim and shown in its inflated position.

Referring to FIG. 1, the pneumatic tire 10 shown therein is comprised of an internally reinforced carcass 11 made of a plurality of plies of rubberized tire fabric which are wrapped around inextensible bead members 13 located at the rim areas of the tire. Each of the carcass plies 12 is made up of rubberized cord fabric composed of a plurality of parallel tire cords 14 disposed side by side to form the tire fabric, and coated on each side with a thin layer of rubber carcass stock. The carcass plies 12 are so arranged that the cords 14 extend from one bead of the tire to the other with the cords of the respective plies crossed and extending in opposite directions. As clearly shown in FIGS. 1 and 3, the carcass 11 is unrestrained in that there are no breaker plies or other plies disposed radially outwardly of the carcass and which tend to restrict the shape of the carcass when the tire is inflated. The carcass 11 is formed by the "flat band" method from plies of tire cord fabric in which the cord extends initially at an angle to the edges of the plies of between 60 and 65°. After shaping of the carcass 11, and the application of the tread 15, the tire 10 is cured in a mold 16 so that the tire is molded at a substantially lower sectional height than its inflated sectional height or in other words the tire is low molded, and as is well-known to those skilled in the art, in a tire fabricated in what is referred to as the flat band method, as well as tires fabricated by conventional methods on a core of predetermined cross-section, the cord angle of the cords of oppositely biased carcass plies in the tire, as molded, as well as in the inflated tire, will progressively increase from the longitudinal centerline of the tire to the beads. The "cord angle" of a carcass is, as is well-known to those skilled in the art, the angle that any one cord makes with a line extending parallel to, or coincident with, the longitudinal centerline or equatorial centerline of the carcass and intersecting the cord at the point at which the cord angle is to be determined.

As further shown in FIG. 1, the tire 10 is cured so that the distance from the radially outer side 17 of the crown of the carcass 11 to the base 18 of the bead, hereinafter called the sectional height and referred to by SH, is substantially smaller than the maximum sectional width or diameter, referred to as SD, measured from the axially outer surface of the sidewall 19 of carcass 11. In accordance with this invention, the ratio of the sectional height (SH) to the maximum sectional diameter (SD) of the inflated tire is between .7 and .8 and the cord angle of each of the plies 12 relative to the centerline 20 of the tire is between 32 and 36°. Inasmuch as the cord angle of the ply 12 in the tire as inflated is essentially the same as the cord angle of the plies when the tire is as molded or uninflated, it will be apparent to those skilled in the art that the SH/SD ratio of the carcass of the inflated tire of this invention is substantially less than the SH/SD ratio of a natural shape for the same cord angle as a tire of this invention at the centerline 20 of the tire. For example, the SH/SD ratio of a natural shape for a cord angle of 32° at the centerline is approximately .82, and for a cord angle at the centerline of 36°, is approximately .88.

The cords 14 are usually made of a synthetic textile material, such as rayon, nylon, or Dacron but they may also be made of wire.

When the tire of this invention is mounted on a rim and inflated its sectional height substantially increases and its sectional diameter decreases. This characteristic of the tire of this invention is the exact converse of conventional ply tires which do not increase in sectional height upon inflation and substantially increase in sectional diameter upon inflation of the tire. When the tire carcass of this invention is inflated, the distance $h$ is measured from the bead of the point 21 of maximum sectional width (SD) is between .5 and .6 of the sectional height (SH).

Figure 2:
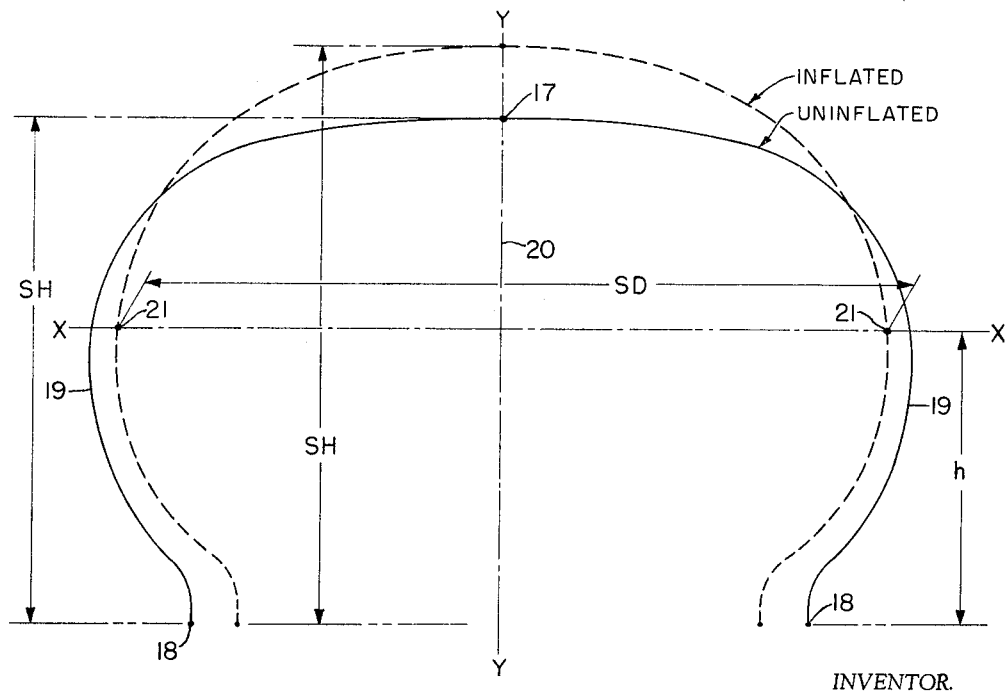
FIG. 2 is a schematic view showing the contour of the tire carcass of this invention in the molded and inflated position.

As shown in FIG. 2 of the drawings, the tire of this invention having a ratio of SH to SD of greater than .7 but less than .8 when inflated, has a ratio of sectional height to sectional width when molded of less than .7. Preferably, the molded tire has a ratio of SH to SD up to 25 percent less when molded than when the tire is inflated. The sectional height of the tire of this invention preferably is 5 to 15 percent greater when inflated than the sectional height of the tire when molded so that the radius from the axis of rotation of the inflated tire to the crown of the carcass is 4 to 6 percent greater than the said radius when molded.

Figure 4:
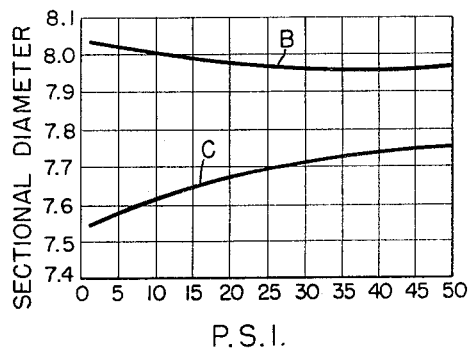
FIG. 4 is a graph showing the sidewall dimension of a conventional tire and the tire of this invention as the tires are inflated.
Figure 5:
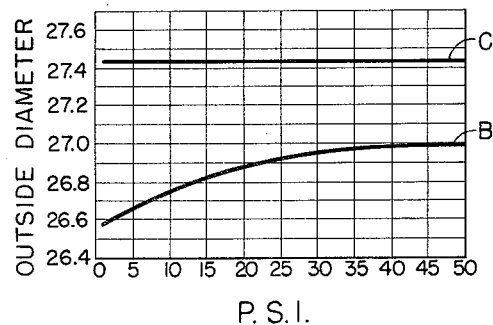
FIG. 5 is a graph similar to FIG. 4 showing the overall diameter of a conventional tire and the tire of the present invention as the tires are inflated.

As shown in FIG. 4, as the inflation pressure is increased, the sectional diameter of a conventional tire increases, as shown by curve C, whereas in the tire of this invention the sectional diameter actually decreases slightly as the tire is inflated, as shown by curve B. FIG. 5 is a graph showing outside diameter versus inflation pressure. As shown by curve C of FIG. 5, the outside diameter of a conventional tire is constant as the tire is inflated. Curve B of FIG. 5 shows that in the tire of this invention the outside diameter increases between 4 and 6 percent as the tire is inflated.

In addition to the foregoing structural characteristics the inflated tire of this invention has a cross-sectional profile shape of unusual configuration. With the horizontal axis X—X shown in FIGS. 2 and 3 passing through the maximum sectional width of the tire, and the vertical axis Y—Y passing through the centerline of the tire, the shape of the inflated tire carcass from the SD in one sidewall to the centerline in the crown may be defined by $$\frac{X^n}{A^n} + \frac{Y^n}{B^n} = 1$$

wherein A is the distance from the vertical axis to the maximum sectional width, B is the distance from the horizontal axis to the centerline in the tire crown, and X and Y are the horizontal and vertical coordinates of any point on the curve of the carcass profile and $n$ is an exponent greater than 2 and less than 3, and preferably between 2.1 and 2.5 at the operating tire pressure.

Since the inflated tire of this invention having a very low profile is molded in a mold such that the outside diameter and the sectional height of the carcass is substantially less than the OD and SH of the inflated tire, the stresses between the cords in the crown during operation of the tire are relieved as the tire passes through the road contact area because the cords in the crown of the tire are moved closed to the molded shape thereof which cancels some of the stresses caused by inflation of the tire. The carcass preferably has an *SH/SD* ratio in the most deflected portion of the inflated tire in contact with the road, which is greater than the *SH/SD* ratio of the carcass when the tire is uninflated and which is less than the *SH/SD* ratio of the carcass when the tire is inflated, but unloaded. This is in direct contrast with conventional ply tires wherein the tire is cured in a mold having an OD equal to or greater than the OD of the inflated tire. Thus, in a conventional tire the stresses are increased upon inflation and further increased as the tire passes through the road contact area inasmuch as in such a tire the *SH/SD* ratio of the carcass is less when the tire is inflated than when the tire is molded or uninflated and becomes increasingly less when the inflated tire is deflected.

While certain representative embodiments and details have been shown for the purpose of illustrating the invention, it will be apparent to those skilled in this art that various changes and modifications may be made therein without departing from the spirit or scope of the invention.

What is claimed is:

1. A non-belted, low molded, low profile pneumatic tire, comprising an unrestrained carcass having spaced beads and a plurality of plies extending from bead to bead, said plies each including parallel cords extending at one cord angle at the circumferential centerline of the carcass and at progressively increasing cord angles from said centerline to said beads, the cords of next adjacent plies being oppositely inclined relative to said centerline, the carcass when the tire is inflated to normal operating pressure having a ratio of sectional height to sectional width which is substantially less than said ratio of a natural shape for said one cord angle at the circumferential centerline.

2. A non-belted, low molded, low profile pneumatic tire as described in claim 1 in which the ratio of sectional height to sectional width of said carcass when the tire is inflated and deflected under normal conditions is greater than said ratio when the tire is molded and is less than said ratio when the tire is inflated but unloaded.

3. A non-belted, low molded, low profile pneumatic tire as described in claim 1 in which said ratio of sectional height to sectional width of the carcass when the tire is inflated is between .7 and .8, and said one cord angle is between 32° and 36°.

4. A non-belted, low molded, low profile pneumatic tire as described in claim 1 in which said sectional height of said carcass when the tire is inflated is 5–15% greater than the sectional height of the carcass when the tire is in a molded condition.

5. A method of making a non-belted, low profile pneumatic tire, comprising providing an uncured tire having an unrestrained carcass including oppositely biased cord plies the cord angle of which progressively increases from the circumferential centerline of the carcass, and maintaining the carcass during curing of the tire in an unnatural toric shape having a ratio of sectional height to sectional width which is less than the ratio of sectional height to sectional width of a natural shape for a cord angle equal to the actual cord angle at the circumferential centerline of the carcass during curing of the tire by an amount sufficient to assure that when the tire is inflated to normal operating pressure the ratio of sectional height to sectional width of the carcass will be substantially less than said ratio of said natural shape.

6. A method of making a non-belted, low profile pneumatic tire, said method being adapted to provide a cured tire having a carcass with a predetermined ratio of sectional height to sectional width when the tire is inflated to normal operating pressure and including the steps of providing an uncured tire having an unrestrained carcass including oppositely biased cord plies the cord angle of which progressively increases from the circumferential centerline of the carcass and is equal to the cord angle of a natural shape having a ratio of sectional height to sectional width which is substantially greater than said predetermined ratio, and during curing of the tire maintaining the carcass in an unnatural toric shape having a ratio of sectional height to sectional width less than said ratio of said natural shape by an amount sufficient to assure that when the tire is inflated the ratio of sectional height to sectional width of the carcass will substantially less than said ratio of said natural shape.

7. A method of making a pneumatic tire as described in claim 5 in which said actual cord angle of the carcass during curing of the tire is no less than about 32° and and said ratio of said unnatural shape at which the carcass is maintained during curing the tire is less than .7 to assure that said ratio of the carcass when the tire is inflated will be no greater than about .8.

8. A method of making a pneumatic tire as described in claim 6 in which said cord angle at said centerline of the carcass during curing of the tire is no less than about 32° and said predetermined ratio is no greater than about .8.

9. A method of fabricating a pneumatic tire as described in claim 6 in which the cord angle at said centerline of the carcass during curing of the tire is between 32° and 26°, said ratio of said unnatural shape is less than .7, and said predetermined ratio is between .7 and .8.

References Cited by the Examiner

UNITED STATES PATENTS

| | | | |
|---|---|---|---|
| 1,201,282 | 10/1916 | Fisher | 152—352 |
| 1,554,370 | 9/1925 | Renner | 152—353 |
| 1,802,088 | 4/1931 | Midgley | 152—353 |
| 1,846,042 | 2/1932 | Taylor | 152—352 |
| 2,237,819 | 4/1941 | Hawkin | 125—352 X |
| 3,057,391 | 10/1962 | Williams | 152—356 |

ARTHUR L. LA POINT, *Primary Examiner.*